(12) United States Patent
Han et al.

(10) Patent No.: US 10,784,483 B2
(45) Date of Patent: Sep. 22, 2020

(54) ELECTRODE ASSEMBLY AND RECHARGEABLE BATTERY INCLUDING THE SAME

(71) Applicant: Samsung SDI Co., Ltd., Yongin-si, Gyeonggi-do (KR)

(72) Inventors: Da-Woon Han, Yongin-si (KR); Jan-Dee Kim, Yongin-si (KR); Seong-Gi Choo, Yongin-si (KR); Sung-Hwa Eo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 319 days.

(21) Appl. No.: 15/298,116

(22) Filed: Oct. 19, 2016

(65) Prior Publication Data

US 2017/0125764 A1 May 4, 2017

(30) Foreign Application Priority Data

Oct. 28, 2015 (KR) .................. 10-2015-0150479

(51) Int. Cl.
*H01M 2/26* (2006.01)
*H01M 10/04* (2006.01)
(Continued)

(52) U.S. Cl.
CPC .......... *H01M 2/1673* (2013.01); *H01M 2/08* (2013.01); *H01M 2/26* (2013.01); *H01M 4/661* (2013.01);
(Continued)

(58) Field of Classification Search
None
See application file for complete search history.

(56) References Cited

U.S. PATENT DOCUMENTS

2003/0232243 A1* 12/2003 Hong .................. H01M 2/1653
429/161
2010/0124694 A1* 5/2010 Hikata .................... B26F 1/384
429/94
(Continued)

FOREIGN PATENT DOCUMENTS

| JP | 2010-118315 A | 5/2010 |
| JP | 2011-081964 A | 4/2011 |

(Continued)

OTHER PUBLICATIONS

English translation of Tatebayashi et al (JP 2014/167890) (Year: 2014).*

*Primary Examiner* — Yoshitoshi Takeuchi
(74) *Attorney, Agent, or Firm* — Lewis Roca Rothgerber Christie LLP

(57) ABSTRACT

A rechargeable battery according to another exemplary embodiment of the present invention includes an electrode assembly including a first electrode including a first electrode plate, a plurality of first electrode uncoated regions protruded from the first electrode plate, a base member, and a coupled member formed at at least one lateral side of the base member, a separator overlapping the first electrode, and a second electrode including a second electrode plate overlapping the separator, a plurality of second electrode uncoated regions protruded from the second electrode plate, a base member, and a coupled member formed at at least one lateral side of the base member, wherein a ratio of a thickness (T2*2) of one of the coupled members to a thickness (T1) of one of the base members is between about 3 and about 6.

8 Claims, 12 Drawing Sheets

(51) Int. Cl.
*H01M 2/16* (2006.01)
*H01M 2/08* (2006.01)
*H01M 4/66* (2006.01)
H01M 4/02 (2006.01)
H01M 10/052 (2010.01)
H01M 10/0587 (2010.01)

(52) U.S. Cl.
CPC ...... *H01M 10/0431* (2013.01); *H01M 10/052* (2013.01); *H01M 10/0587* (2013.01); *H01M 2004/021* (2013.01); *H01M 2220/20* (2013.01)

(56) References Cited

U.S. PATENT DOCUMENTS

2011/0014521 A1* 1/2011 Matsuyama ........ H01M 4/0404
429/217
2014/0030568 A1* 1/2014 Hato ................. H01M 10/0587
429/94

FOREIGN PATENT DOCUMENTS

JP 2014/167890 * 9/2014 ............ H01M 10/04
JP 2014-167890 A 9/2014

* cited by examiner

ELECTRODE ASSEMBLY AND RECHARGEABLE BATTERY INCLUDING THE SAME

CROSS-REFERENCE TO RELATED APPLICATION

This application claims priority to, and the benefit of, Korean Patent Application No. 10-2015-0150479 filed in the Korean Intellectual Property Office on Oct. 28, 2015, the entire contents of which are incorporated herein by reference.

BACKGROUND

1. Field

Embodiments of the present invention relate to an electrode assembly for a rechargeable battery, and a rechargeable battery including the electrode assembly.

2. Description of the Related Art

Unlike a primary battery, a rechargeable battery can be iteratively charged and discharged. Low-capacity rechargeable batteries are used for portable compact electronic apparatuses, such as mobile phones, notebook computers, and camcorders, while high-capacity rechargeable batteries are widely used as, for example, a power source for driving a motor of a hybrid vehicle, etc.

Recently, a high power rechargeable battery that includes a non-aqueous electrolyte having high energy density has been developed, and is characterized by a large capacity rechargeable battery in which a plurality of rechargeable batteries are coupled in series to drive devices requiring a large amount of power, devices such as motors for electric vehicles.

In addition, a large capacity rechargeable battery generally includes a plurality of rechargeable batteries that are coupled in series, and the rechargeable battery may be formed of cylindrical and angular shapes. Further, the rechargeable battery includes an electrode assembly for performing charging and discharging, the electrode assembly including a positive electrode, a negative electrode, and a separator therebetween. The electrode assembly may have a structure where a plurality of positive electrode plates and a plurality of negative electrode plates are layered, or may have a structure in which band-shaped positive and negative electrodes are spirally wound.

Among the rechargeable batteries, a battery for starting a vehicle engine requires a high-output characteristic, and thus a rechargeable battery having a high-output characteristic has been researched and developed.

The above information disclosed in this Background section is only for enhancement of understanding of the background of embodiments of the invention, and therefore may contain information that does not form the prior art.

SUMMARY

Embodiments of the present invention provide an electrode assembly that can improve a high-output characteristic of a rechargeable battery, and a rechargeable battery including the same.

An electrode assembly according to an exemplary embodiment of the present invention includes a first electrode including a first electrode plate, a plurality of first electrode uncoated regions protruded from the first electrode plate, a base member, and a coupled member formed at at least one lateral side of the base member, a separator overlapping the first electrode, and a second electrode including a second electrode plate overlapping the separator, a plurality of second electrode uncoated regions protruded from the second electrode plate, a base member, and a coupled member formed at at least one lateral side of the base member, wherein a ratio of a thickness (T2*2) of one of the coupled members to a thickness (T1) of one of the base members is between about 3 and about 6.

The first electrode uncoated region may be integrally formed with the base member of the first electrode, and the second electrode uncoated region may be integrally formed with the base member of the second electrode.

The base member of the first electrode may include a metal foil including aluminum, and the base member of the second electrode may include a metal foil including copper or nickel.

The coupled member of the first electrode may include $LiPF_6$, and the coupled member of the second electrode may include graphite or carbon.

The first electrode, the separator, and the second electrode may be spirally wound in a jelly-roll shape.

A distance between neighboring ones of the first electrode uncoated regions and a distance between neighboring ones of the second electrode uncoated regions may each be about 250 mm or less.

An area of the coupled member between center axes of a first one of the first electrode uncoated regions and a neighboring second one of the first electrode uncoated regions, and an area of the coupled member between center axes of the second one of the first electrode uncoated regions and a neighboring third one of the first electrode uncoated regions, may respectively be about 40 $cm^2$ to about 300 $cm^2$.

The electrode assembly may further include a first lead tab connected with the first electrode uncoated region by welding in a first welding region, a second lead tab connected with the second electrode uncoated region by welding in a second welding region, a first sealing tape surrounding the first welding region, and a second sealing tap surrounding the second welding region, and the first welding region may be about 10% to about 90% of an area of the first electrode uncoated region surrounded by the first sealing tape, and the second welding region may be about 10% to about 90% of an area of the second electrode uncoated region surrounded by the second sealing tape.

The first welding region and the second welding region may respectively include a plurality of small welding regions.

A rechargeable battery according to another exemplary embodiment of the present invention includes an electrode assembly including a first electrode including a first base member, and a first coupled member at at least one of lateral sides of the first base member, a separator, and a second electrode including a second base member, and a second coupled member formed at at least one of lateral sides of the second base member, and a case housing the electrode assembly, wherein a ratio of a thickness (T2*2) of the first coupled member to a thickness (T1) of the first base member is between about 3 and about 6, and wherein a ratio of a thickness (T2*2) of the second coupled member to a thickness (T1) of the second base member is between about 3 and about 6.

The first electrode may further include a first electrode plate where the first coupled member is formed, and first electrode uncoated regions protruded from the first electrode plate, and the second electrode may further include a second electrode plate where the second coupled member is formed, and second electrode uncoated regions protruded from the second electrode plate.

The electrode assembly may be spirally wound in a jelly-roll shape, and a distance between neighboring ones of the first electrode uncoated regions, and a distance between neighboring ones of the second electrode uncoated regions, may each be about 250 mm or less.

An area of the first coupled member between center axes of a first one of the first electrode uncoated regions and a neighboring second one of the first electrode uncoated regions, and an area of the first coupled member between center axes of the second one of the first electrode uncoated regions and a neighboring third one of the first electrode uncoated regions, may respectively be about 40 cm$^2$ to about 300 cm$^2$.

The rechargeable battery may further include a first lead tab connected with the first electrode uncoated regions by welding in a first welding region, a second lead tab connected with the second electrode uncoated regions by welding in a second welding region, a first sealing tape surrounding the first welding region, and a second sealing tap surrounding the second welding region, and the first welding region may be about 10% to about 90% of an area of the first electrode uncoated region surrounded by the first sealing tape, and the second welding region may be about 10% to about 90% of an area of the second electrode uncoated region surrounded by the second sealing tape.

The first welding region and the second welding region may each include a plurality of small welding regions.

The case may include a pouch including edges that are welded while contacting the first sealing tape and the second sealing tape.

The first base member of the first electrode may include a metal foil including aluminum, and the second base member of the second electrode may include a metal foil including copper or nickel.

The first coupled member of the first electrode may include LiPF$_6$, and the second coupled member of the second electrode may include graphite or carbon.

DETAILED DESCRIPTION

Figure 1:
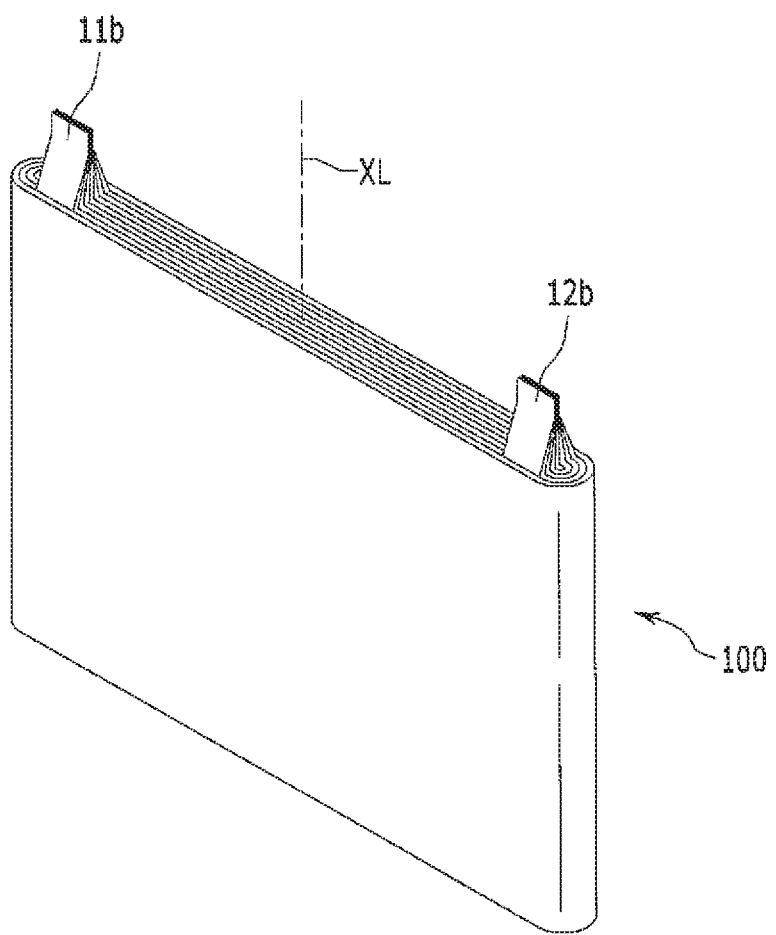
FIG. 1 is a perspective view of an electrode assembly according to an exemplary embodiment of the present invention.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
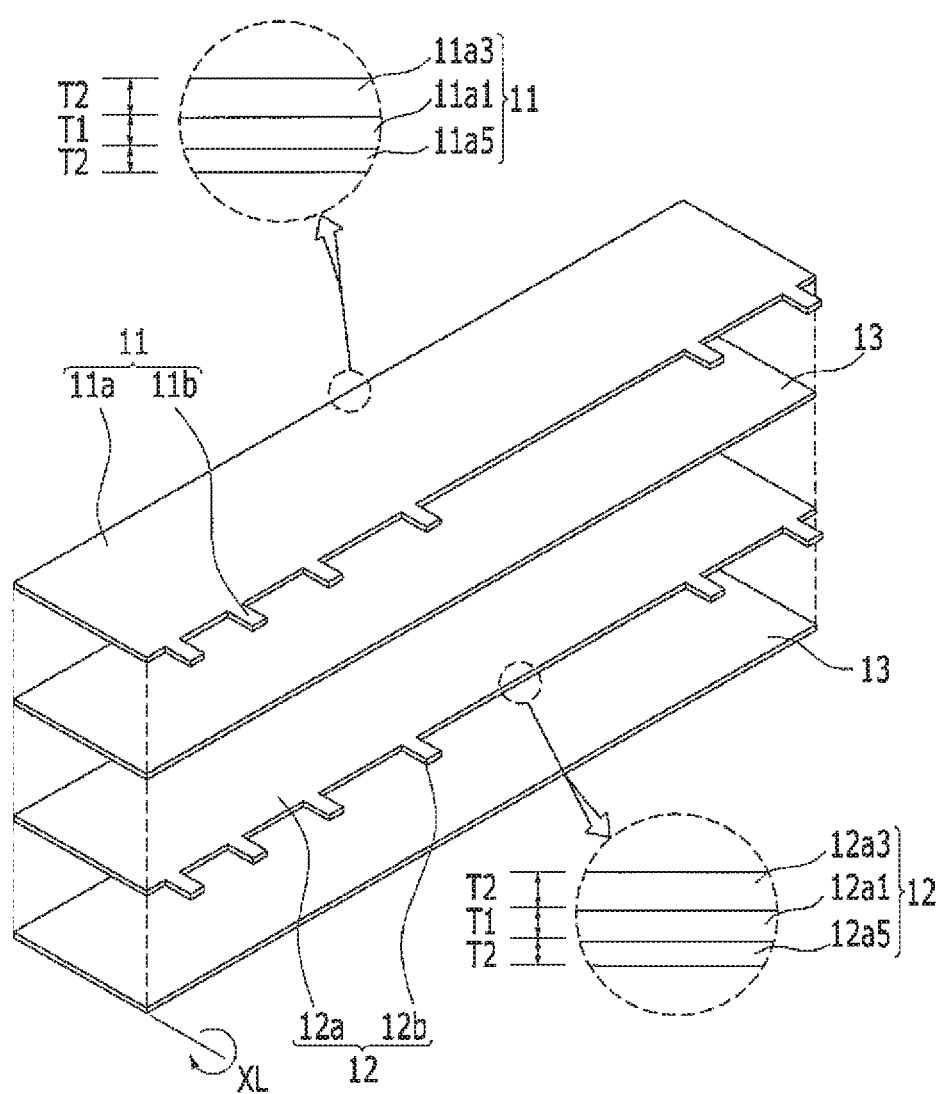
FIG. 2 is an exploded perspective view of the electrode assembly of FIG. 1.

FIG. 1 is a perspective view of an electrode assembly according to an exemplary embodiment of the present invention, and FIG. 2 is an exploded perspective view of the electrode assembly of FIG. 1.

As shown in FIG. 1 and in FIG. 2, an electrode assembly 100 according to an exemplary embodiment of the present invention includes a first electrode 11, a second electrode 12, and a separator 13 between the first electrode 11 and the second electrode 12. The separator 13 insulates the first and second electrodes 11 and 12. The first electrode 11, the separator 13, the second electrode 12, and then the separator 13 again, may be sequentially layered in such an order.

The electrode assembly 100 may have a jelly-roll shape formed by spirally winding the first electrode 11, the separator 13, the second electrode 12, and the separator 13 with respect to a winding shaft while being layered. The electrode assembly 100 may optionally be pressed to be flattened after being spirally wound.

The first electrode 11 and the second electrode 12 respectively include electrode plates 11a and 12a where an active material is coated to a thin plate formed of a band-shaped metal foil, and respectively include electrode uncoated regions 11b and 12b that are not coated with the active material.

The separator 13 may be made of a porous material, which may include polyolefin, polyethylene, polypropylene, and the like.

Hereinafter, the first electrode 11 and the second electrode 12 will be described in further detail with reference to the drawings.

Figure 3:
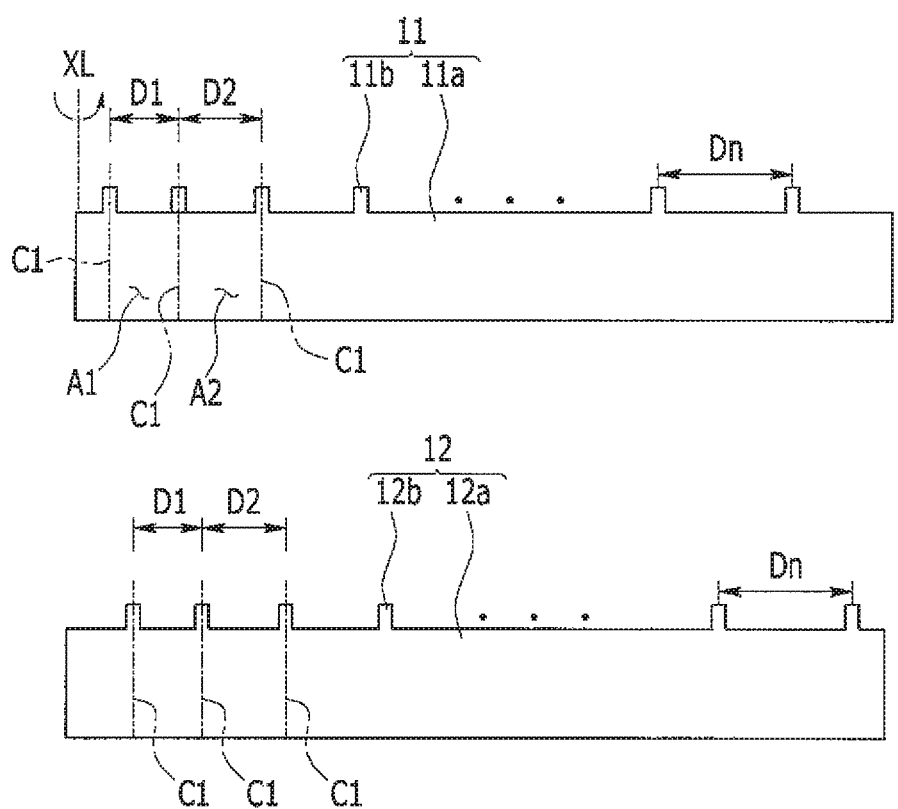
FIG. 3 is a schematic top plan view of a first electrode and a second electrode according to another exemplary embodiment of the present invention.
Figure 4:
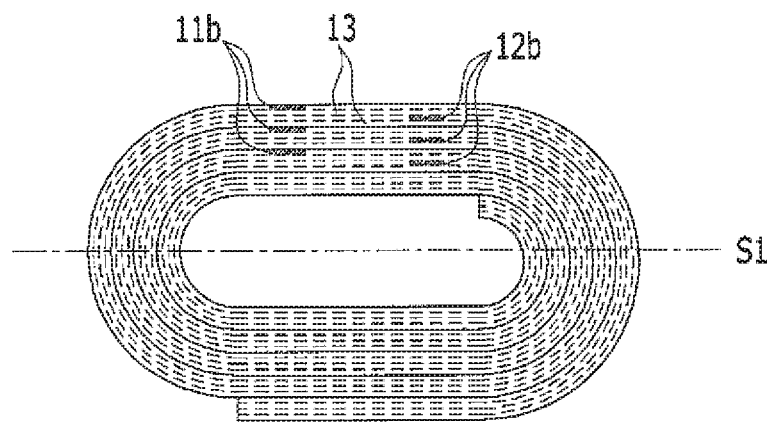
FIG. 4 is a schematic top plan view of an electrode assembly including the first and second electrodes of FIG. 3.
Figure 5:
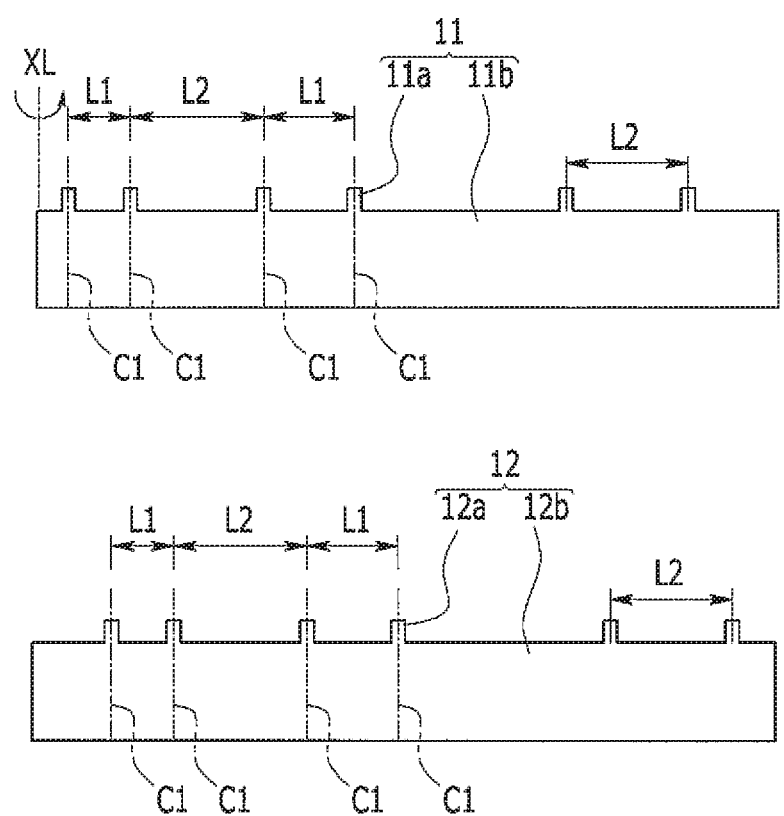
FIG. 5 is a schematic top plan view of a first electrode and a second electrode of yet another exemplary embodiment of the present invention.
Figure 6:
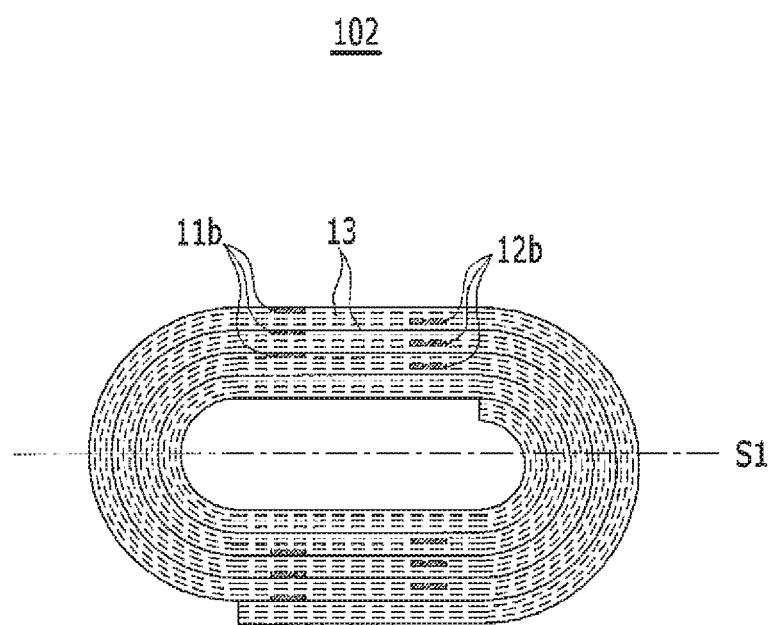
FIG. 6 is a schematic top plan view of an electrode assembly including the first and second electrodes of FIG. 5.

FIG. 3 is a schematic top plan view of the first electrode 11 and the second electrode 12 according to the exemplary embodiment of the present invention, FIG. 4 is a schematic top plan view of the electrode assembly 100 including the electrodes 11 and 12 of FIG. 3, FIG. 5 is a schematic top plan view of a first electrode 11 and a second electrode 12 according to another exemplary embodiment of the present invention, and FIG. 6 is a schematic top plan view of an electrode assembly 102 including the electrodes 11 and 12 of FIG. 5.

Referring to FIG. 3, a first electrode 11 includes an electrode plate 11a, and a plurality of electrode uncoated regions 11b protruded from the electrode plate 11a, and the second electrode 12 includes an electrode plate 12a, and a plurality of electrode uncoated regions 12b protruded from the electrode plate 12a.

As shown in FIG. 2, the electrode plate 11a of the first electrode 11 includes a base member 11a1, a first active material layer 11a3, and a second active material layer 11a5. The first active material layer 11a3 and the second active material layer 11a5 are formed at respective lateral surfaces of the base member 11a1. The electrode plate 12a of the second electrode 12 includes a base member 12a1, a first active material layer 12a3, and a second active material layer 12a5. The first active material layer 12a3 and the second active material layer 12a5 are formed at respective lateral surfaces of the base member 12a1.

For example, the first electrode plate 11a of the first electrode 11 may be formed by coating an active material that includes a lithium compound, such as $LiPF_6$ to a metal foil, and the second electrode plate 12a of the second electrode 12 may be formed by coating an active material, such as graphite or carbon to a metal foil such as copper or nickel.

The plurality of electrode uncoated regions 11b of the first electrode 11 are arranged at a distance, or varying distances (e.g., D1, D2, . . . Dn), from each other along one side of the electrode plate 11a. As the first electrode 11 rotates with respect to a rotation shaft, the electrode uncoated regions 11b overlap, and are separated with gaps, such that the electrode uncoated regions 11b are adjacent each other. That is, every electrode uncoated region 11b may overlap an adjacent electrode uncoated region 11b every single rotation, as shown in FIG. 4, or, alternatively, the electrode uncoated regions 11b are formed such that adjacent electrode uncoated regions 11b overlap every half rotation (i.e., two sets of respectively adjacent electrode uncoated regions 11b are formed in the wound electrode assembly 102, as shown in FIG. 6). In this case, one rotation implies a rotation until the first electrode 11 rotating with respect to the rotation shaft reaches its rotation start point XL.

Further, the second electrode 12 may be formed with the same shape as the first electrode 11, and the plurality of electrode uncoated regions 12b are distanced from each other along one side of the electrode plate 12a. As shown in FIGS. 4 and 6, as the second electrode 12 rotates with respect to a rotation shaft, the electrode uncoated regions 12b overlap and are separated with gaps that enable the electrode uncoated regions 12b to be adjacent each other.

Meanwhile, when the electrode uncoated regions 12b of the second electrode 12 do not overlap with the electrode uncoated regions 11b of the first electrode 11. That is, the first electrode uncoated region 11b of the first electrode 11 and the first electrode uncoated region 12b of the second electrode 12 are separated from each other when they are layered and wound.

The electrode assemblies 100, 102 of embodiments of the present invention are a jelly-roll type, and when the electrode assembly 100, 102 is iteratively wound with respect to a rotation shaft, a rotation diameter of the electrode assembly 100, 102 wound later is relatively increased compared to that of the anteriorly wound electrode assembly.

Thus, in the jelly-roll type of electrode assembly 100 formed by being iteratively wound, a distance Dn between first electrode uncoated regions 11b of first electrodes wound later (to be away from an interior of the electrode assembly 100) may be greater than a distance D1 between first electrode uncoated regions 11b that are anteriorly wound (to be near the interior of the electrode assembly 100) so as to align the first electrode uncoated regions 11b in the same locations, and a distance (e.g., Dn) between neighboring first electrode uncoated regions 11b may be about 250 mm or less. In this case, the same locations indicates that a center of the respective first electrode uncoated regions 11b (e.g., center shafts C1) overlap each other to be aligned at the same location.

Because the second electrode uncoated regions 12b are wound similarly to the way the first electrode uncoated regions 11b are wound, a distance between the second electrode uncoated regions 12b wound later (i.e., wound away from a center of the wound electrode assembly 100) may be greater than a distance between the anteriorly wound second uncoated regions 12b (i.e., wound near the center of the wound electrode assembly 100), and a distance (e.g., Dn) between neighboring second electrode uncoated regions 12b may be about 250 mm or less.

More specifically, as shown in FIG. 3, when a single first electrode uncoated region 11b exists for every rotation (or every turn), a distance between neighboring first electrode uncoated regions 11b is increased corresponding to each rotation (e.g., as the number of rotations (turns) is increased). When a single first electrode uncoated region 11b is formed for every rotation, as shown in FIG. 4, the first electrode uncoated regions 11b are at only one of upper and lower sides with respect to a center line S1 that crosses the electrode assembly 100, such that the first electrode uncoated regions 11b are at one side of the wound electrode assembly 100.

In addition, as shown in FIG. 5, when two first electrode uncoated regions 11b are formed for every rotation, a first distance L1 and a second distance L2, which is wider than the first distance L1, may alternately become a distance between neighboring first electrode uncoated regions 11b, and such an alternation of the distances L1 and L2 is iterative for every rotation. In this case, as the number of rotations is increased, the first distance L1 may gradually increase, and the second distance L2 may also gradually increase.

When two first electrode uncoated regions 11b are formed for every rotation, as shown in FIG. 5, first electrode uncoated regions 11b respectively overlap at both of the upper and lower sides of the electrode assembly 102 with respect to a center line S1 crossing the electrode assembly 102, and second electrode uncoated regions 12b also overlap at the upper and lower sides, as shown in FIG. 6.

In this case, distances L1 and L2 between respective adjacent ones of the first electrode uncoated regions 11b, and distances L1 and L2 between respective adjacent ones of the second uncoated regions, may be about 250 mm or less.

Referring back to FIG. 2, thicknesses T1 of the base members 11a1 and 12a1 of each of the first and second electrode plates 11a and 12a may be formed within a range of about 10 μm to about 20 μm, and thicknesses T2 of the first active material layers 11a3 and 12a3 and the second active material layers 11a5 and 12a5 may be respectively formed to be about 30 μm or less and about 40 μm or less.

When the first active material layers 11a3 and 12a3 and the second active material layers 11a5 and 12a5 are respectively coupled to each other, and thus form a coupled member, a ratio of thickness (T2*2) of the coupled member (e.g., the thickness T2 of one of the first active material layers 11a3 and 12a3 plus the thickness T2 of one of the second active material layers 11a5 and 12a5) to a thickness (T1) of one of the base members 11a1 and 12a1 may be between about 3 and about 6 (e.g., about $3 \leq T2*2/T1 \leq 6$).

In addition, an area A1 of the coupled member provided between first and second ones of the first electrode uncoated regions 11b, and an area A2 of the coupled member provided between second and third ones of the first electrode uncoated regions 11b, may respectively be about 40 $cm^2$ to about 300 $cm^2$. Similarly, an area of the coupled member provided between first and second ones of the second electrode uncoated regions 12b, and an area of the coupled member between second a third ones of the second electrode uncoated regions 12b, may respectively be about 40 $cm^2$ to about 300 $cm^2$. In this case, the area of the coupled member corresponds to the area of the first or second active material layers 11a3, 12a3, 11a5, and 12a5.

Figure 7:
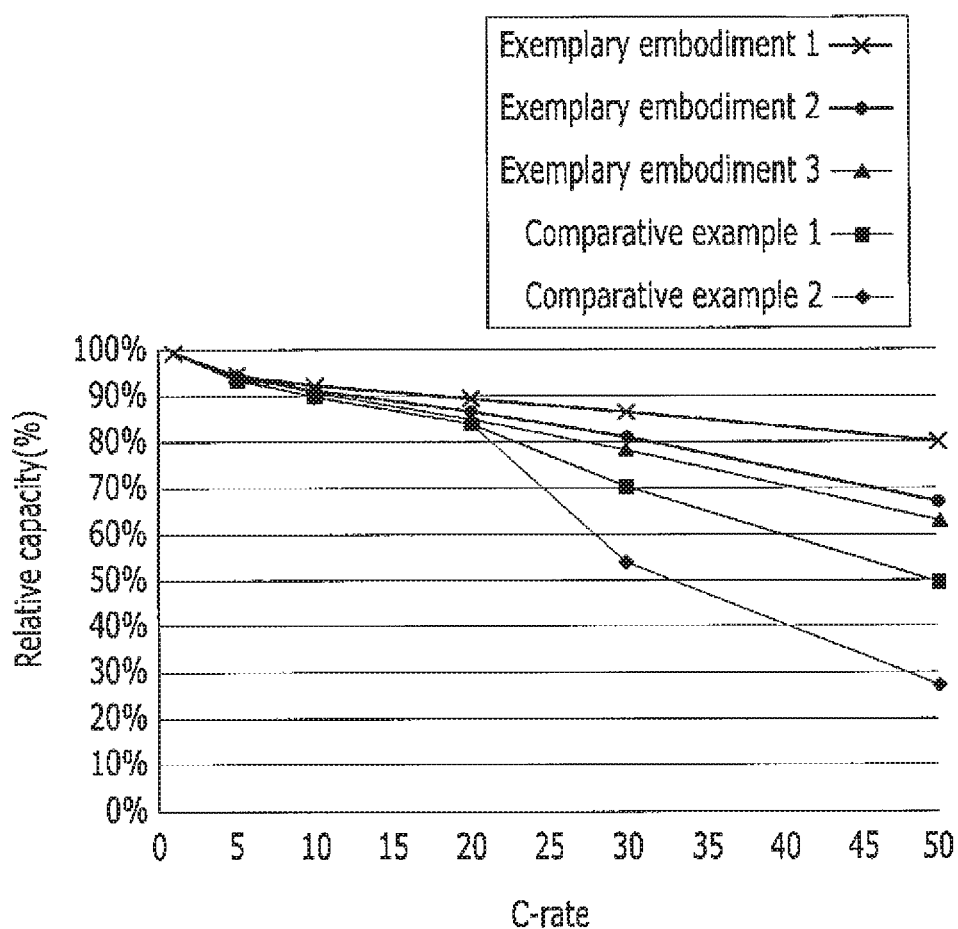
FIG. 7 is a graph illustrating relative capacity with respect to C-rate at room temperature according to exemplary embodiments of the present invention and according to comparative examples of a conventional art.
Figure 8:
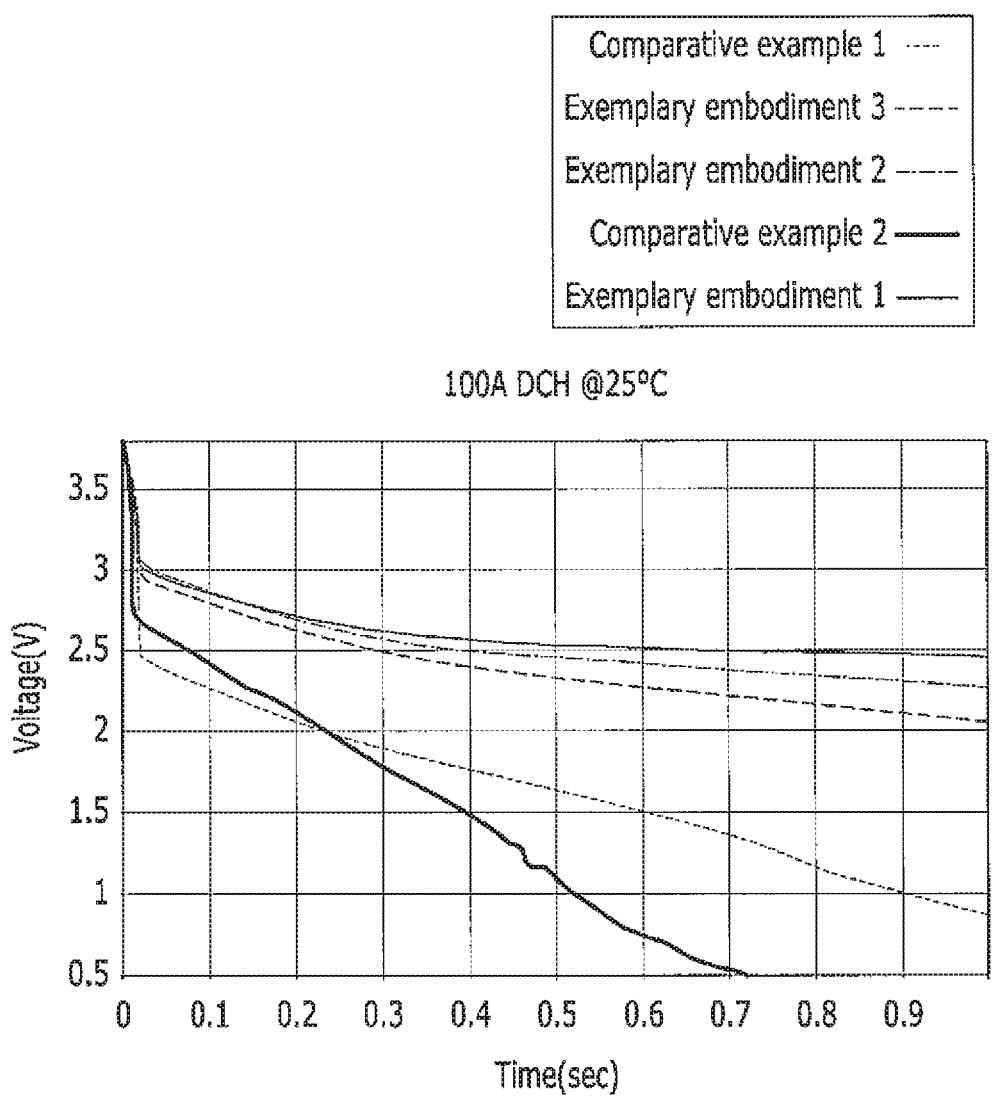
FIG. 8 is a graph illustrating voltage variation with respect to time at room temperature according to exemplary embodiments of the present invention and according to comparative examples of a conventional art.

FIG. 7 is a graph illustrating a relative capacity ratio (%) with respect to C-rate at room temperature according to exemplary embodiments of the present invention and according to comparative examples of a conventional art, and FIG. 8 is a graph illustrating voltage variation with respect to time at room temperature according to exemplary embodiments of the present invention and according to comparative examples of a conventional art.

In rechargeable batteries, each having an output voltage of about 2 V to about 3.8 V, and each having a capacity of about 2 Ah, according to exemplary embodiments of the present invention and according to comparative examples of a conventional art, an electrolyte solution may be EC (ethylene carbonate), DMC (dimethyl carbonate), or DEC (diethyl carbonate) where 1 mol of $LiPF_6$ is dissolved, and the length of each protruded uncoated regions 11b, 12b of first and second electrodes 11, 12 is about 15 mm, and the thickness thereof is about 0.15 mm. In the exemplary embodiments of the present invention, the thickness (T2*2) of coupled member/the thickness (T1) of base member may be between about 3 and about 6 (i.e., 3≤T2*2/T1≤6).

A distance between all neighboring electrode uncoated regions 11b, 12b is about 50 mm or less, according to Exemplary embodiment 1, a distance between all neighboring electrode uncoated regions 11b, 12b is above about 50 mm and less than about 150 mm according to Exemplary embodiment 2, a distance between all neighboring electrode uncoated regions is above about 150 mm and less than about 250 mm according to Exemplary embodiment 3, a distance between all neighboring electrode uncoated regions is above about 250 mm and less than about 600 mm according to a Comparative example 1, and a distance between all neighboring electrode uncoated regions is above about 600 mm according to a Comparative example 2.

As shown in FIG. 7, the rechargeable batteries according to the first to third exemplary embodiments of the present invention each have a Relative capacity (%) that is similar to those of the first and second comparative examples at a low C-rate.

In FIG. 7, relative capacity indicates a percentage of discharge capacity that varies as the C-rate is increased compared to the discharge capacity when a current of 1 C flows after manufacturing the rechargeable battery, which 1 C indicates a current value that can wholly charge or discharge capacity of the battery in one hour (for example, when a 50 C current is used, the battery can be wholly charged or discharged in 1/50 of an hour). As the rate at which the capacity is decreased is reduced corresponding to an increase of the C-rate, the battery has an excellent high-output characteristic.

In FIG. 7, the rechargeable batteries of the first to third exemplary embodiments of the present have relative capacity of about 70% or more at a C-rate of about 30 C or higher, but the rechargeable batteries of the first and second comparative examples have relative capacity of about 70% or less. Further, in the first to third exemplary embodiments of the present invention, the rechargeable battery has relative capacitance of about 60% or more at a C-rate of about 50 C or higher.

In FIG. 8, rechargeable batteries of the exemplary embodiments and of the comparative examples are charged with a current value of about 1 C to reach a voltage of about 3.6 V, and are cut-off with about 0.05 C, and are then discharged at about 100 C for 1 second.

As shown in FIG. 8, the lowest limit maintains about 2 V or more in the exemplary embodiments of the present invention, but the lowest limit is about 1 V or less in the comparative examples. As described, the rechargeable batteries according to the exemplary embodiment can maintain high output characteristics of about 2 V or more even through performing discharging at a high-rate of about 100 C, but in the rechargeable batteries according to the comparative examples, a voltage is rapidly dropped to about 1 V or lower.

As described, the rechargeable batteries according to the exemplary embodiments of the present invention have significantly excellent relative capacity and voltage characteristics in high-rate discharging compared to the rechargeable batteries of the comparative examples. Thus, the rechargeable battery according to the present exemplary embodiment can be applied as a battery that requires high-rate discharging, such as using the battery to start a vehicle engine.

Hereinafter, a rechargeable battery including the electrode assembly 100, 102 of FIG. 1 and of FIG. 6 will be described with reference to the accompanying drawings.

Figure 9:
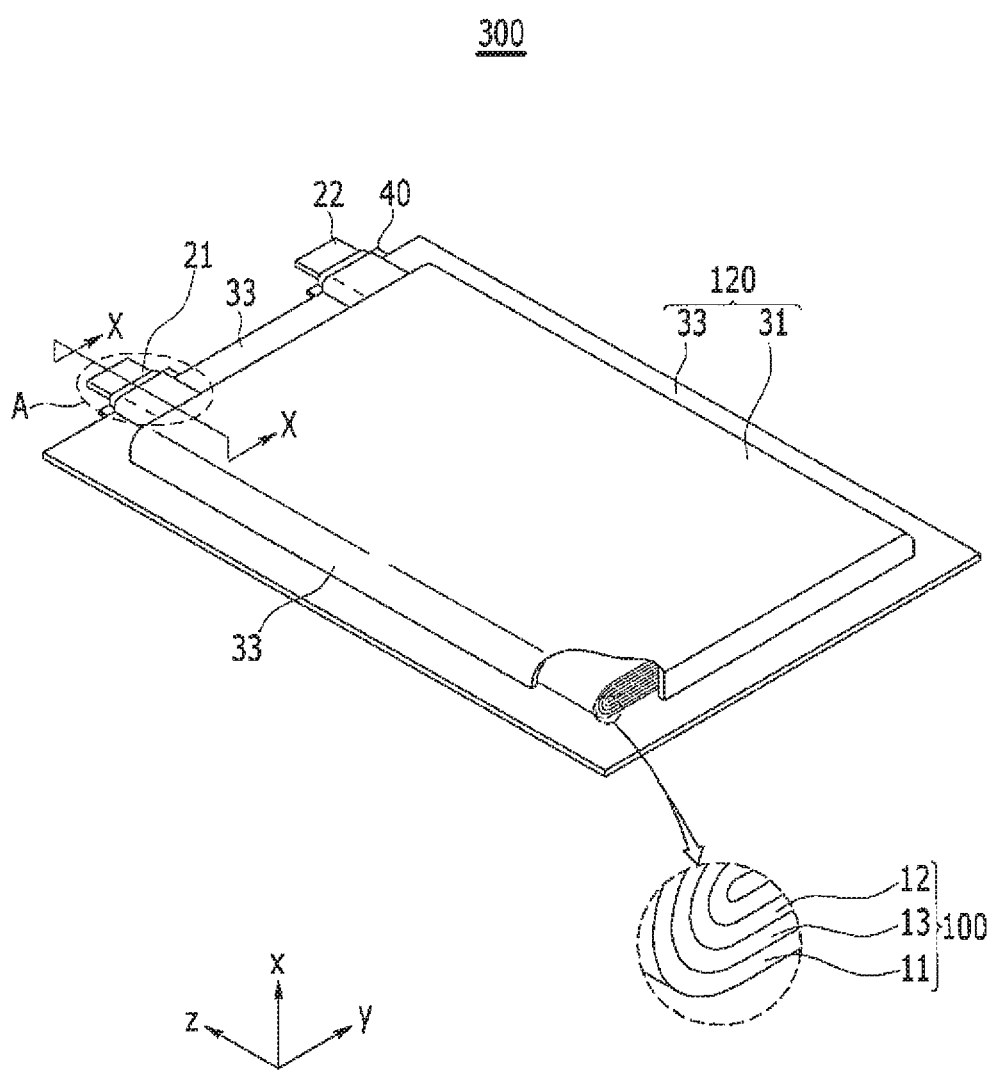
FIG. 9 is a perspective view of a rechargeable battery according to an exemplary embodiment of the present invention.
Figure 10:
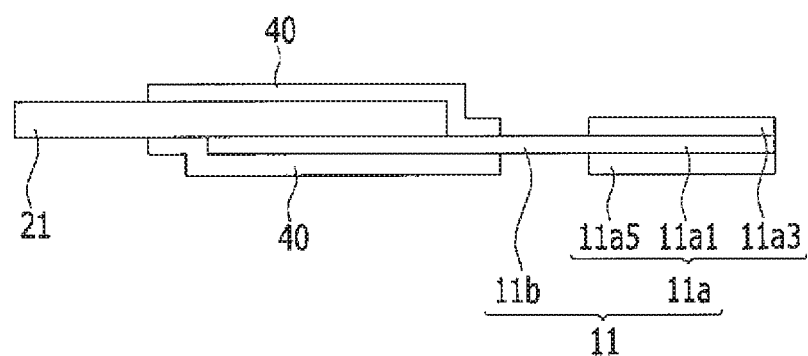
FIG. 10 is a cross-sectional view of FIG. 9, taken along the line X-X.
Figure 11:
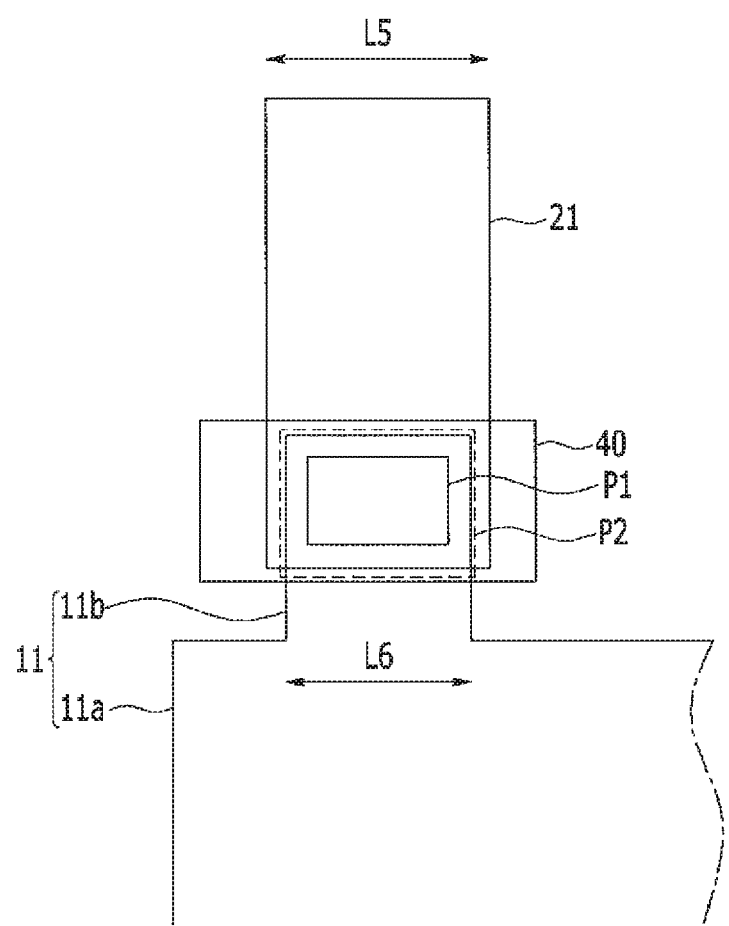
FIG. 11 is an enlarged top plan view of the part A in FIG. 9 according to an exemplary embodiment of the present invention.
Figure 12:
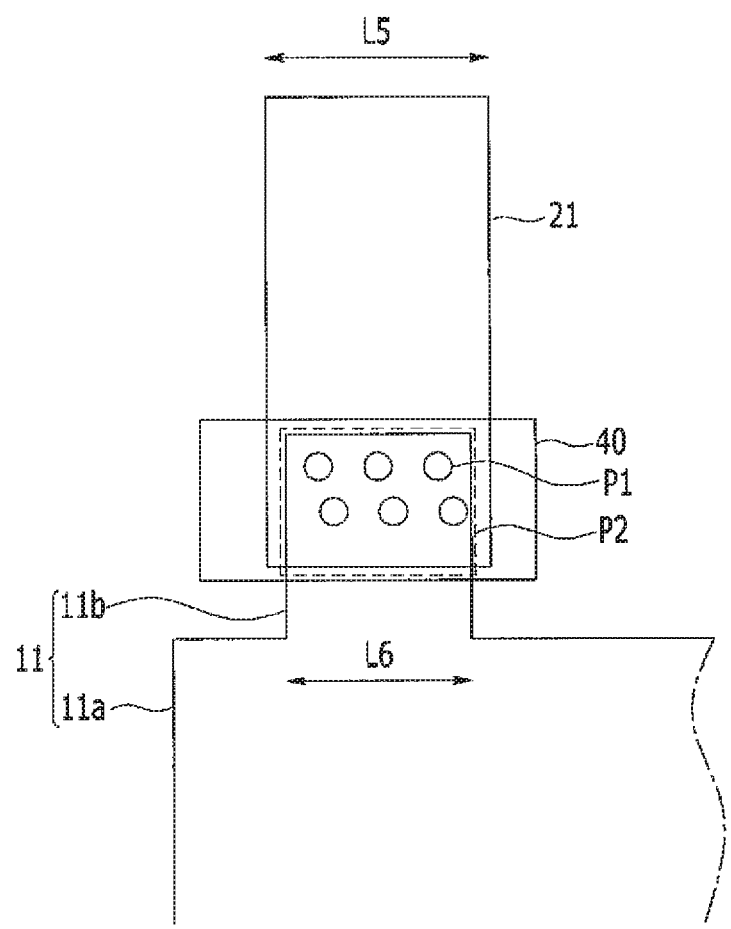
FIG. 12 is an enlarged top plan view of the part A in FIG. 9 according to another exemplary embodiment of the present invention.

FIG. 9 is a perspective view of a rechargeable battery according to an exemplary embodiment of the present invention, FIG. 10 is a cross-sectional view of FIG. 9, taken along the line X-X, FIG. 11 is an enlarged top plan view of the part A in FIG. 9 according to an exemplary embodiment of the present invention, and FIG. 12 is an enlarged top plan view of the part A of FIG. 9 according to another exemplary embodiment of the present invention.

As shown in FIG. 9 and FIG. 10, a rechargeable battery 300 according to an exemplary embodiment of the present invention includes an electrode assembly 100, a case 120 in which the electrode assembly 100 is installed, a first lead tab 21, and a second lead tab 22. The first lead tab 21 and the second lead tab 22 are electrically connected with the electrode assembly 100, and protrude to the outside of the case 120.

The rechargeable battery 100 according to the present exemplary embodiment may be an engine-starting battery, which is discharged at about 30 C (C-rate) to about 50 C (C-rate). Here, C denotes a charging and discharging rate, as described above.

The electrode assembly 100, 102 is shown in FIG. 1 to FIG. 6, and may be pressed after being spirally wound in a jelly-roll shape, such that the electrode assembly 100, 102 may have an oval-shaped cross-section.

The case may be an angular or pouch type, and the case 120 will be exemplarily described as a pouch-type case 120.

The pouch-type case 120 may have a multi-layered sheet structure. For example, the pouch-type case 120 includes a polymer sheet forming an inner surface and providing insulation and thermal welding, a polyethylene terephthalate (PET) sheet forming an outer surface to protect the pouch-type case 120, a nylon sheet or PET-nylon combination sheet, and a metal sheet providing mechanical strength. The metal sheet may be, for example, an aluminum sheet, and is provided between the polymer sheet and the nylon sheet.

The pouch-type case 120 includes an accommodation portion 31 where the electrode assembly 100 is inserted, and an edge portion 33 provided at an outer side of the accommodation portion 31 and bonded by thermal welding for sealing. The first lead tab 21 and the second lead tab 22 are disposed at an outer side of one side of the edge portion 33.

The first lead tab 21 and the second lead tab 22 are respectively electrically connected with first electrode 11 uncoated regions 11b and second electrode 12 uncoated regions 12b (refer to FIG. 1) of the electrode assembly 100. The first lead tab 21 and the second lead tab 22 are drawn out to the outside from one end of the pouch-type case 120, and are arranged at a distance from each other.

A portion where the first lead tab 21 and the first electrode uncoated regions 11b overlap, and a portion where the second lead tab 22 and the second electrode uncoated regions 12b overlap, may be sealed by being surrounded by a sealing tape 40.

Referring to FIG. 11, a width L5 of the first lead tab 21 may be greater than a width L6 of the first electrode uncoated region 11b, and specifically, the width L5 may be about 10% greater than the width L6. In addition, the width of the second lead tab 22 may be greater than the width of the second electrode uncoated region 12b, and may be wider than the second electrode uncoated region by about 10%.

The first lead tab 21 and the second lead tab 22 may be respectively electrically connected with the first electrode uncoated region 11b and the second electrode uncoated region 12b by ultrasonic welding and the like.

The sealing tape 40 may surround a region where the first lead tab 21 and the first electrode uncoated region 11b are welded, and may surround a region where the second lead tab 22 and the second electrode uncoated region 12b are welded, so as to prevent the regions from being exposed. In this case, an area P1 of the region where the lead tabs 21 and 22 and the electrode uncoated regions 11b and 12b are welded may be about 10% to about 90% with respect to an area P2 of the electrode uncoated regions 11b and 12b located in the portion where the electrode tabs and the electrode uncoated regions are surrounded.

Referring to FIG. 12, the lead tabs and the electrode uncoated regions may be welded in dot shapes, or may be welded by a plurality of partially welded regions. In this case, the area P1 of the partially welded regions (e.g., a collective area P1 of the partially welded regions) may be about 10% to about 90% with respect to the area P2 of the electrode uncoated regions 11b and 12b surrounded by the sealing tape 40.

While embodiments of the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

| Description of Some of the Reference Characters | |
|---|---|
| 11: first electrode | 11a: first electrode plate |
| 11b: first electrode uncoated region | 11a1, 12a1: base member |
| 11a3, 12a3: first active material layer | |
| 11a3, 12a5: second active material layer | |
| 12: second electrode | 12a: second electrode plate |
| 12b: second electrode uncoated region | 13: separator |
| 21: first lead tab | 22: second lead tab |
| 31: accommodation portion | 33: edge portion |
| 40: sealing tape | 100, 102: electrode assembly |
| 300: rechargeable battery | |

What is claimed is:

1. An electrode assembly comprising:
    a first electrode comprising a first electrode plate, a plurality of first electrode uncoated regions protruded from the first electrode plate, a first base member of the first electrode plate, and a first coupled member comprising a first active material layer and a second active material layer formed at respective lateral surfaces of the first base member;
    a separator overlapping the first electrode; and
    a second electrode comprising a second electrode plate overlapping the separator, a plurality of second electrode uncoated regions protruded from the second electrode plate, a second base member of the second electrode plate, and a second coupled member comprising a first active material layer and a second active material layer formed at respective lateral surfaces of the second base member,
    wherein a ratio of a thickness (T2*2) of one of the first or second coupled members to a thickness (T1) of one of the first or second base members is between about 3 and about 6,
    wherein the first electrode, the separator, and the second electrode are spirally wound in a jelly-roll shape with respect to a rotation shaft,
    wherein the first electrode uncoated regions and the second electrode uncoated regions are protruded in a same direction, and
    wherein the first electrode uncoated regions are separated with gaps such that the first electrode uncoated regions are adjacent each other, as the first electrode rotates with respect to the rotation shaft, and the second electrode uncoated regions do not overlap the first electrode uncoated regions.

2. The electrode assembly of claim 1, wherein the first electrode uncoated regions are integrally formed with the first base member of the first electrode, and
    wherein the second electrode uncoated regions are integrally formed with the second base member of the second electrode.

3. The electrode assembly of claim 1, wherein the first base member of the first electrode comprises a metal foil comprising aluminum, and
    wherein the second base member of the second electrode comprises a metal foil comprising copper or nickel.

4. The electrode assembly of claim 3, wherein the first coupled member of the first electrode comprises $LiPF_6$, and
    wherein the second coupled member of the second electrode comprises graphite or carbon.

5. The electrode assembly of claim 1, wherein a distance between neighboring ones of the first electrode uncoated regions and a distance between neighboring ones of the second electrode uncoated regions are each about 250 mm or less.

6. The electrode assembly of claim 1, wherein an area of the first coupled member between center axes of a first one of the first electrode uncoated regions and a neighboring second one of the first electrode uncoated regions, and an area of the first coupled member between center axes of the second one of the first electrode uncoated regions and a neighboring third one of the first electrode uncoated regions, are respectively about 40 $cm^2$ to about 300 $cm^2$.

7. The electrode assembly of claim 1, further comprising:
    a first lead tab connected with the first electrode uncoated regions by welding in a first welding region;
    a second lead tab connected with the second electrode uncoated regions by welding in a second welding region;
    a first sealing tape surrounding the first welding region; and
    a second sealing tape surrounding the second welding region,
    wherein the first welding region is about 10% to about 90% of an area of the first electrode uncoated regions surrounded by the first sealing tape, and wherein the second welding region is about 10% to about 90% of an area of the second electrode uncoated regions surrounded by the second sealing tape.

8. The electrode assembly of claim 7, wherein the first welding region and the second welding region respectively comprise a plurality of small welding regions.

\* \* \* \* \*